United States Patent
Knierim

(10) Patent No.: US 12,547,441 B2
(45) Date of Patent: Feb. 10, 2026

(54) PROTECTION OF A PROCESS OF SETTING UP A SUBDIRECTORY AND A NETWORK INTERFACE FOR A CONTAINER INSTANCE

(71) Applicant: Siemens Aktiengesellschaft, Munich (DE)

(72) Inventor: Christian Knierim, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 212 days.

(21) Appl. No.: 18/578,464

(22) PCT Filed: Jul. 18, 2022

(86) PCT No.: PCT/EP2022/070085
§ 371 (c)(1),
(2) Date: Jan. 11, 2024

(87) PCT Pub. No.: WO2023/001773
PCT Pub. Date: Jan. 26, 2023

(65) Prior Publication Data
US 2025/0103377 A1   Mar. 27, 2025

(30) Foreign Application Priority Data
Jul. 20, 2021   (EP) .................................. 21186611

(51) Int. Cl.
*G06F 9/455*   (2018.01)
*G06F 21/53*   (2013.01)

(52) U.S. Cl.
CPC .......... *G06F 9/45558* (2013.01); *G06F 21/53* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | |
|---|---|---|
| 2009/0222880 A1 | 9/2009 | Mayer et al. |
| 2014/0282518 A1 | 9/2014 | Banerjee |
| | (Continued) | |

OTHER PUBLICATIONS

PCT International Search Report of International Searching Authority mailed Nov. 17, 2022 corresponding to PCT International Application No. PCT/EP2022/070085 filed Jul. 18, 2022.

*Primary Examiner* — Raqiul A Choudhury
(74) *Attorney, Agent, or Firm* — Schmeiser, Olsen & Watts, LLP

(57) ABSTRACT

A method for protecting a process of setting up a subdirectory and/or a network interface for a container instance for providing a container-based application, is provided including—generating a directory guideline which includes at least one incorporation rule for assigning the subdirectory of the container instance to the subdirectory in the source directory; and/or generating an interface guideline which includes at least one incorporation rule for assigning the network interface of the container instance to the network interface of the associated host computer, loading a container image, an associated configuration file and the directory guideline and/or the interface guideline into a runtime environment of the host computer, checking, before the process of starting the container instance, and—generating the container instance from the container image in the host computer only in the event of a positive checking result.

16 Claims, 2 Drawing Sheets

(56) References Cited

U.S. PATENT DOCUMENTS

| | | | |
|---|---|---|---|
| 2018/0260574 A1* | 9/2018 | Morello | G06F 9/44505 |
| 2018/0314846 A1 | 11/2018 | Schultz et al. | |
| 2019/0155693 A1* | 5/2019 | Bomma | G06F 11/1417 |
| 2019/0310872 A1* | 10/2019 | Griffin | G06F 8/71 |
| 2020/0034167 A1* | 1/2020 | Parthasarathy | G06F 9/45558 |
| 2023/0093925 A1* | 3/2023 | Liguori | G06F 9/5077 |
| | | | 718/1 |

* cited by examiner

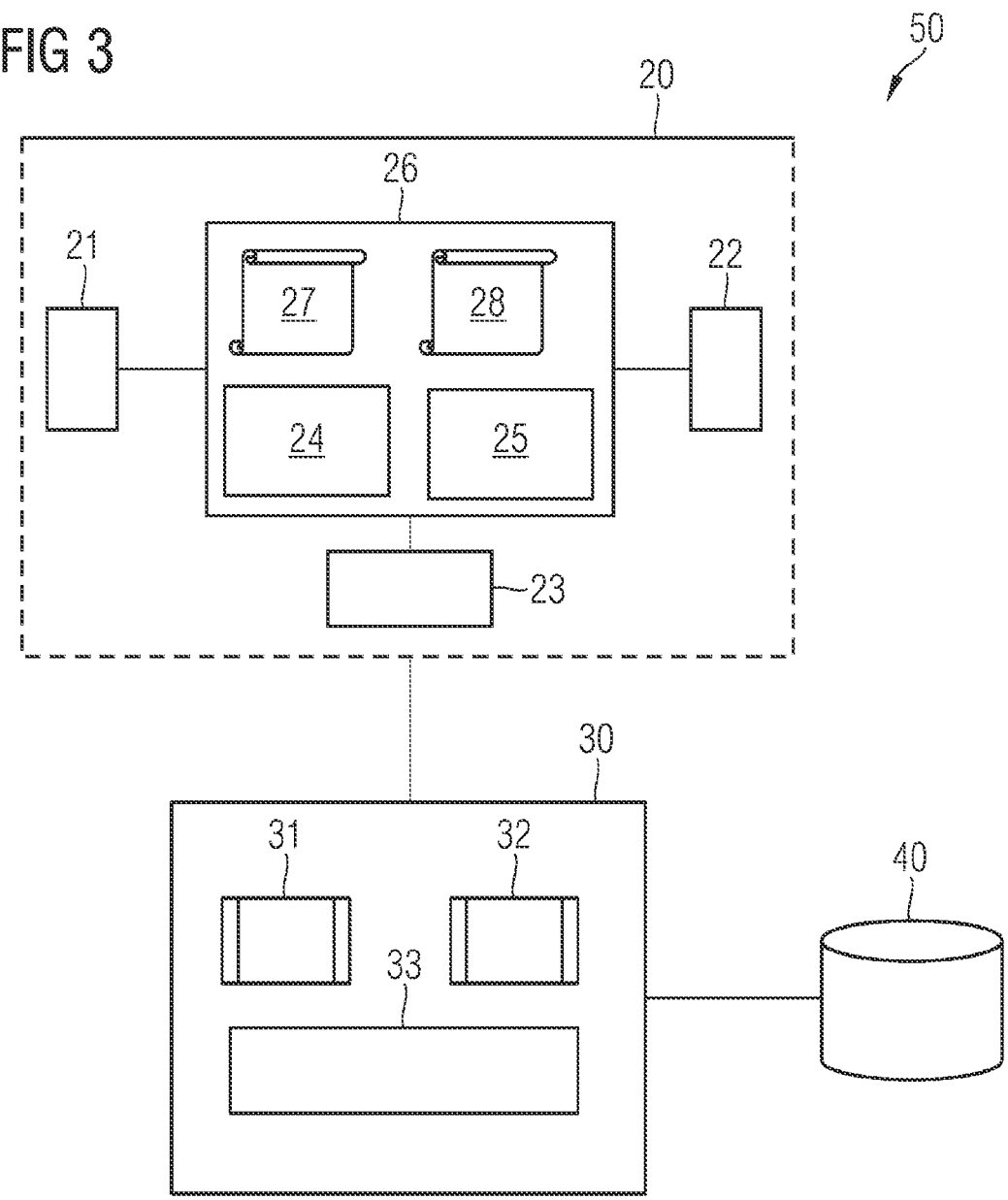

PROTECTION OF A PROCESS OF SETTING UP A SUBDIRECTORY AND A NETWORK INTERFACE FOR A CONTAINER INSTANCE

CROSS-REFERENCE TO RELATED APPLICATIONS

This application claims priority to PCT Application No. PCT/EP2022/070085, having a filing date of Jul. 18, 2022, which claims priority to EP Application No. 21186611.6, having a filing date of Jul. 20, 2021, the entire contents all of which are hereby incorporated by reference.

FIELD OF TECHNOLOGY

The following relates to a method for protecting a process of setting up a subdirectory and/or a network interface for a container instance, wherein a subdirectory of the container instance is provided by allocating a subdirectory in a source directory of an assigned physical data memory and a network interface of the container instance is provided by allocating a corresponding virtual or physical network interface of an assigned host computer.

BACKGROUND

Container virtualization is a method in which multiple instances of an operating system can utilize an operating system kernel of a host computer in isolation from one another. Software containers, called containers hereinafter for short, thus constitute a lightweight kind of virtualization of a runtime environment on a host computer, also called host system, and isolate a software application operated in a container instance from the underlying host system. Software applications, called application hereinafter for short, are now being implemented by containers in many fields such as, for example, industrial automation and process control, but also for applications in transport systems or vehicles.

In order to be able to start a container instance on the host system, a container image is required; this contains both the application software itself and also the binary programs and libraries needed for the application software. The binary programs and libraries needed are often provided by the use of a so-called base image containing a packet manager, with the aid of which further components can be installed within the container image.

In order to be able to assign parameters to the container instance upon starting or to be able to persistently store data generated by the container instance, when such a container instance is started, so-called "volumes" are transferred to it and mounted into the container instance. A "volume" is a subdirectory of a file system in the container instance which is mounted into the container instance by the underlying operating system and in which data are persistently, i.e., permanently, stored.

With the aid of such a persistent subdirectory, for a container instance for example keys of a cryptographic network protocol for the secure operation of network services, private keys for certificates, configuration settings for the container instance or environment information of the underlying device or of the entire runtime environment are transferred to the container instance and the application operated in the container instance is thereby parameterized as well.

When a container image is created, it is not known what source directories of the underlying system will be mounted as persistent subdirectories into the container instance. For transferring starting parameters, however, a target directory into which the persistent subdirectory with the transfer parameters is intended to be mounted can be defined for the creator of the container image.

A problem arises, then, if other, unauthorized container instances access a subdirectory, in particular a persistent subdirectory, without authorization, since for example key material provided for container instances formed from other container images is picked up as a result. A similar problem arises when incorporating network interfaces that are intended to be allocated to a container instance. Unauthorized shared use of network interfaces enables traffic between other container instances to be intercepted. This allocation of a network interface takes place in the case of a current container instance directly by way of commands of the container runtime environment, for example by the definition of specific parameters in Docker commands or with the aid of Docker compose files. In this case, the creator of a container image does not know what other container images will link to the same network or to the same network interfaces. Malicious container instances may thus link to a network interface allocated to another container instance and spy out data by this means.

SUMMARY

An aspect relates to increasing the difficulty of an unauthorized access and unauthorized modification or spying out with respect to a container instance, in particular with respect to file systems allocated to the container instance and network interfaces allocated thereto.

In accordance with a first aspect, embodiments of the invention relate to a method for protecting a process of setting up wherein at least one subdirectory of the container instance is provided by allocating at least one subdirectory in a source directory of an assigned physical data memory and at least one network interface of the container instance is provided by allocating at least one corresponding virtual or physical network interface of an assigned host computer, comprising the steps of generating a directory policy comprising at least one incorporation rule for allocating the subdirectory of the container instance to the subdirectory in the source directory, in particular for persistent subdirectories in which data are persistently stored;

generating an interface policy comprising at least one incorporation rule for allocating the network interface of the container instance to a virtual and/or physical network interface of the assigned host computer, loading a container image, an assigned configuration file, and the directory policy and/or the interface policy into a runtime environment of the host computer, before the process of starting the container instance, checking whether all subdirectories in the source directory that are stipulated by the container image for the container instance are able to be incorporated according to the directory policy, and/or whether all network interfaces that are stipulated by the configuration file are able to be incorporated according to the interface policy without contravening incorporation options for subdirectories and network interfaces of further container instances that already exist, and generating the container instance from the container image in the host computer only in the event of a positive checking result.

To facilitate understanding, in the individual features the expressions "the at least one" and "the at least one network interface" have been replaced by "the subdirectory" and "the network interface". Consequently, the features in the claims apply not only to a single subdirectory and one network policy, but also in each case to a plurality of subdirectories and network interfaces. This applies to all of the claims and the description.

By checking the configuration instructions in the configuration file and the requirements stipulated in the container image in respect of directories and network interfaces vis-à-vis the directory and interface policies prior to starting the container instance, it is possible to identify security-critical subdirectories and network interfaces of the container instance. In particular, a check is made to ascertain whether and with what incorporation options the same subdirectories or network interfaces have already been incorporated into other container instances on the host computer. If the directory and network policies are no longer enforceable owing to the already present incorporation into other container instances, this leads to a negative checking result. It is only if no incorporation option prescribed in the directory and interface policies is contravened that a positive checking result is present, and the container instance is generated. Consequently, only checked and secure container instances are present on the host computer. The directory policy comprises in particular incorporation rules for persistent subdirectories. These are in particular need of protection owing to their use for introducing security-relevant data or configuration settings of the application, such as cryptographic keys, or for storing persistent data generated by the application.

The at least one network interface can be virtual network interfaces which generate a virtual network on the host computer, or physical network interfaces of the host computer which transfer data from the host computer.

In an embodiment, the directory policy and the interface policy are created by a creator of the configuration file and are linked to the configuration file.

As a result, a creator of the configuration file can predefine both the incorporation rules for the subdirectories and network interfaces into the container instance.

In an embodiment, the directory policy is created by a creator of the container image and is linked to the container image.

As a result, not just the operator of the runtime environment and thus the operator of the host computer but the creator of the container image can stipulate the incorporation rules for subdirectories and network interfaces.

In an embodiment, the directory policy comprises metainformation in regard to the subdirectories and the metainformation in the form of an image tag is allocated to the container image.

This allows a simple coupling of the directory policy to the container image.

In an embodiment, the directory policy and/or the interface policy stipulate(s) whether the subdirectory in the source directory and/or the network interface may be incorporated exclusively by a single container instance or may be incorporated by a plurality of container instances formed from the same container image or by a plurality of container instances formed from different container images.

The access to a subdirectory in the source directory can thus be predefined depending on the container image from which the accessing container instance was created.

In an embodiment, the directory policy stipulates at least one permitted access option to the subdirectory.

What is thus recorded by the directory policy is whether the source directory only for the container instance itself is intended to be incorporated exclusively as a target directory into the container instance, whether it may be mounted for the same instance type, i.e., container instances which are generated from the same container image, and whether other instance types, i.e., container instances which have been generated by a different container image, may be incorporated and with what access options. Access options are for example only reading, only writing or reading and writing access or else a restriction regarding the executability of files mounted into the subdirectory, and so on. The designations "incorporate", "mount" and "set up" are used as synonyms in the description.

In an embodiment, the directory policy and/or the interface policy stipulate(s) incorporation rules depending on a signature of the container image.

Incorporation rules can thus be introduced and enforced depending on the creator of the container image.

In an embodiment, the directory policy and/or the interface policy comprise(s) a reference to the configuration file with directives which refer to at least one environment variable, and the environment variable comprises an indication of a subdirectory in the container instance.

The target directory can be dynamically indicated with an environment variable. In this case, in the directory policy, the subdirectory of the container instance is not explicitly mentioned, but rather indicated by a variable whose value indicates the subdirectory to be incorporated.

In an embodiment, the interface policy comprises a reference to the configuration file with permitted properties of the network interfaces.

In an embodiment, a central incorporation database is generated for the runtime environment of the container instance, and the incorporation database comprises a name and a version of the container image from which the container instance was generated, the target directory in the container instance, the source directory of the assigned physical data memory and the permitted incorporation options and access options of the target directory, and indications and incorporation options of the network interfaces of the container instance.

In an embodiment, the incorporation database is persistently stored.

In an embodiment, on the basis of the incorporation database, a check is made to ascertain whether a source directory requested for a subdirectory or a superordinate or subordinate directory of the source directory and/or whether a requested network interface is already currently incorporated for a different container image or has ever been incorporated for a container image of a different type.

By the incorporation database, container instances present in parallel, but also generated at an earlier time, and their incorporated subdirectories and network interfaces can be provided for the checking with the directory and/or interface policy.

In an embodiment, after successful incorporation of a subdirectory and/or a network interface, the name and the version of the container image, the target directory in the container instance, the source directory of the assigned physical data memory, the permitted incorporation options and access options of the target directory and/or the incorporated network interface and the incorporation options for the network interface are communicated to the incorporation database and stored there.

Consequently, automatically after each successful setting-up process the incorporation database is updated with the subdirectories and network interfaces currently set up.

In an embodiment, a subdirectory is not incorporated into the container instance if upon the checking of container instances which have been formed from other container images and/or with other configuration files, vis-à-vis the directory policy, it is established that the directory policy contains no permitted incorporation option for the subdirectory to be incorporated or the subdirectory to be incorporated is a superordinate or subordinate directory with respect to a subdirectory not mentioned in the directory policy, and/or wherein a network interface is not incorporated if upon the checking of container instances which have been formed from other container images and/or with other configuration files, vis-à-vis the interface policy, it is established that the interface policy contains no permitted incorporation option for the network interface to be incorporated.

This prevents subdirectories or network interfaces which do not comply with the directory or network policy from being incorporated into the container instance.

A second aspect of embodiments of the invention relate to a device for protecting a process of setting up, wherein at least one subdirectory of the container instance is provided by allocating at least one subdirectory in a source directory of an assigned physical data memory and at least one network interface of the container instance is provided by allocating at least one corresponding virtual or physical network interface of an assigned host computer, comprising a generating unit designed:

to generate a directory policy comprising at least one incorporation rule for allocating the subdirectory of the container instance to the subdirectory in the source directory, in particular for persistent subdirectories in which data are persistently stored;

to generate an interface policy comprising at least one incorporation rule for allocating the network interface of the container instance to the virtual and/or physical network interface of the assigned host computer, to load a container image, an assigned configuration file, and the directory policy and the interface policy into a runtime environment of the host computer, and the host computer is designed, before the process of starting the container instance, to check whether all subdirectories in the source directory that are stipulated by the container image for the container instance are able to be incorporated according to the directory policy, and/or whether all network interfaces that are stipulated by the configuration file are able to be incorporated according to the interface policy without contravening incorporation options for subdirectories and network interfaces of further container instances that already exist, and to generate the container instance from the container image in the host computer only in the event of a positive checking result.

The arrangement can ensure that network interfaces and subdirectories are incorporated according to fixedly predefined incorporation rules for a container instance and access by other container instances is thus preventable.

A third aspect of embodiments of the invention relate to a computer program product (non-transitory computer readable storage medium having instructions, which when executed by a processor, perform actions), comprising the non-transitory or nonvolatile computer-readable medium, which is loadable directly into a memory of a digital computer, comprising program code parts which, when the program code parts are executed by the digital computer, cause the latter to carry out the steps of the method.

Unless indicated otherwise in the following description, the terms "check", "generate", "load" and the like relate to actions and/or processes and/or processing steps which change and/or generate data and/or which convert data into other data, whereby the data can be represented or be present as physical variables, in particular, for example as electrical pulses. The system and host computer, generating device and so on formed therein in particular for the physical and also virtual realization can comprise one or more processors.

A computer program product, such as e.g., a computer program means, can be provided or supplied for example as a storage medium, such as e.g., memory card, USB stick, CD-ROM, DVD, or else in the form of a downloadable file from a server in a network. This can be effected e.g., in a wireless communication network by a corresponding file being transferred to the computer program product or the computer program means.

BRIEF DESCRIPTION

Some of the embodiments will be described in detail, with references to the following Figures, wherein like designations denote like members, wherein:

FIG. 3 shows one exemplary embodiment of a container image with file system layers of an application of the method in a schematic illustration.

DETAILED DESCRIPTION

Figure 1:
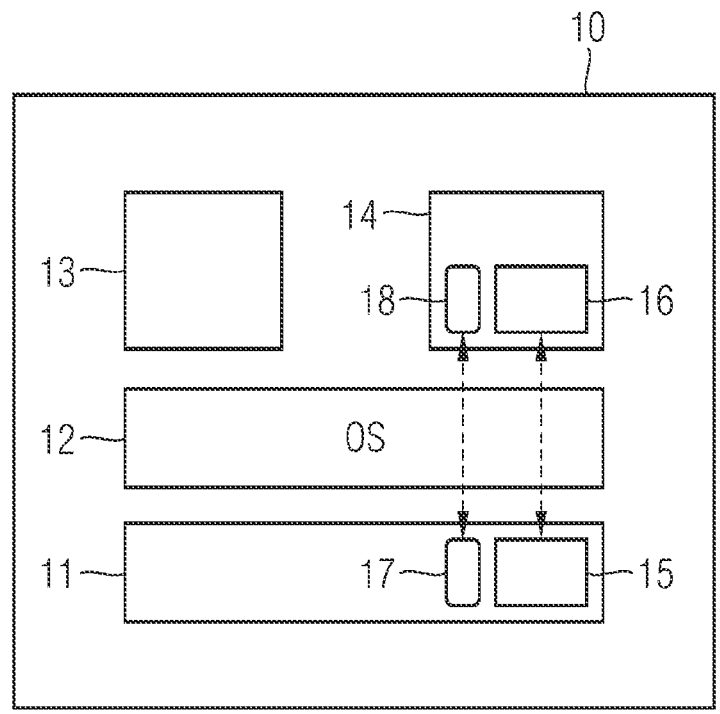
FIG. 1 shows one exemplary embodiment of a host computer with a container instance in a schematic illustration.

FIG. 1 shows a host computer 10 with hardware resources 11, an operating system kernel 12. Hardware resources 11 are for example processors for carrying out operations, a data memory 15 or network interfaces 17, for communicating data to an internal or external network. In the case of a container virtualization, in a runtime environment multiple instances of the operating system can utilize the operating system kernel 12 of the host computer 10 in isolation from one another. The container runtime environment can be used to manage which hardware resources 11 are allocated to the processes in the container instance 13, 14. A container instance 14 can be used for operating a software application by virtue of a container image with a software application being loaded into such an instance of the operating system 12. On the basis of a provision configuration file, called configuration file hereinafter for short, inter alia at least one subdirectory of a source directory 15 is assigned to a subdirectory in a target directory 16 in the container instance 14. In the same way, by the configuration file, network interfaces 17 from the hardware resources 11 of the host computer 10 are assigned to a network interface 18 of the container instance 14. Network interfaces can be virtual internal interfaces or real external interfaces.

In order to be able to assign parameters to the container instance 14 upon starting or to be able to store data generated by the container instance, when the container instance 14 is started, subdirectories of a file system, so-called "volumes", are transferred to the container instance 14 and mounted into the container instance. A persistent subdirectory is a subdirectory of a file system in the container instance 14 which is mounted into the container instance 14 by the underlying operating system 12 and in which data are persistently, i.e., permanently, stored. The file system can be arranged physically on the host computer 10, for example as part of the hardware resources 11, or in a storage unit remote or relocated from the host computer 10. In a Docker runtime environment, a "volume" is mounted with the aid of a so-called "bind mount", for example.

With the aid of such a persistent subdirectory, for a container instance for example keys of a cryptographic network protocol for the secure operation of network services, private keys for certificates, configuration settings for the container instance or environment information of the underlying host computer 10 or of the entire runtime environment are transferred to the container instance and the application operated in the container is thereby parameterized as well.

When a container image is created, it is not known what source directories 15 of the host computer 10 will be mounted as subdirectories 16 into the container instance 14. Furthermore, it is possible for the persisting target to be defined by way of a configuration parameter which is stored by a transfer parameter or within the configuration file which is made available within the mounted persistent target directory for the instance.

The persistent subdirectories to be mounted are transferred upon the starting of the container instance 14 by corresponding start-up parameters by way of the command line. Alternatively, there is the possibility of transferring corresponding persistent subdirectories to the container instance 14 by way of corresponding configuration directives within the configuration file, for example a Docker compose file, or as provision information in an orchestrator.

Figure 2:
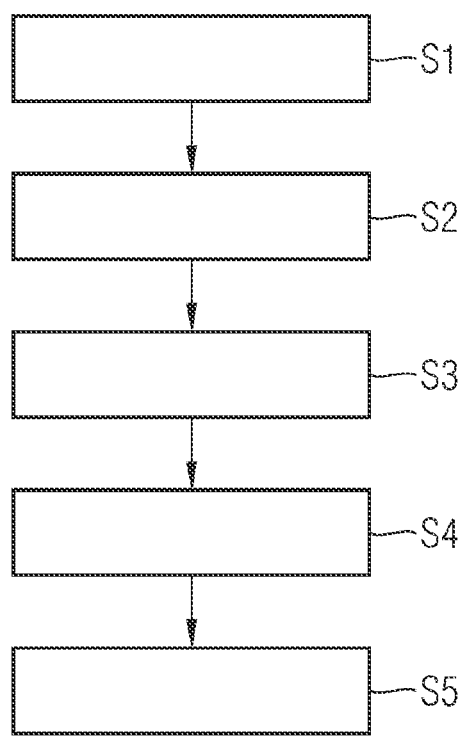
FIG. 2 shows one exemplary embodiment of the method in the form of a flow diagram.

In embodiments, the method according to embodiments of the invention for protecting the process of setting up a subdirectory and/or a network interface for a container instance for providing a container-based application will now be described in greater detail with reference to FIG. 2. In this case, a subdirectory of the container instance 14 is provided by allocating a subdirectory in a source directory 15 of an assigned physical data memory and a network interface of the container instance is provided by allocating a corresponding virtual or physical network interface of an assigned host computer.

A first method step S1 involves generating a directory policy comprising at least one incorporation rule for allocating a subdirectory of the container instance to the subdirectory in the source directory, in particular for persistent subdirectories in which data are persistently stored. Accordingly, method step S2 involves generating an interface policy in the container instance comprising at least one incorporation rule for assigning the network interface of the container instance to the network interface of the assigned host computer. In particular, the directory policy stipulates which directories or files in the container instance may be transferred as persistent subdirectories. Method step S3 involves loading a container image, an assigned configuration file, and the directory policy and/or the interface policy into a runtime environment of the host computer.

The directory policy is created by a creator of the container image and is linked to the container image, for example. The directory policy comprises metainformation in regard to the subdirectories and the metainformation in the form of an image tag is allocated to the container image.

Analogously, method step S2 involves generating an interface policy comprising at least one incorporation rule for allocating the network interface of the container instance to the network interface of the assigned host computer.

The directory policy and the interface policy stipulate whether the subdirectory in the source directory and the network interface may be incorporated exclusively by a single container instance or by a plurality of container instances formed from the same container image or by a plurality of container instances formed from different container images. The directory policy furthermore stipulates a permitted access option in relation to only reading, only writing or reading and writing access to the subdirectory or the network interface. By the directory policy and/or the interface policy, incorporation rules are stipulated depending on a signature of the container image.

In other words, the directory policy stipulates whether a target directory may be mounted exclusively by one container instance or by all container instances of the same instance type, i.e., formed from the same container image, or else by container instances of other instance types, i.e., formed from other container images, for example with the access options of only reading or writing. Furthermore, restrictions in the directory and/or interface policy can be defined depending on the signature of the container image. This is stipulated for persistent subdirectories, in particular.

Analogously to the resource allocation for subdirectories, for network resources in the interface policy it is possible to define whether the or the allocated network interfaces are allocated exclusively to one container instance, are enabled generally or are allocated only to a container image having a signature predefined in the interface policy. The interface policy is thus used for control to the effect that only trustworthy container instances maintain communication with one another. The interface policy can either be defined for individual container images and be allocated by way of image tags, for example, or reference interface definitions of a configuration file, for example by way of a Docker compose file. If the interface definition is effected at the Docker compose level, each individual referenced interface can be restricted, and a default behavior can be defined for further interfaces.

In one embodiment, the directory policy and the interface policy are created by a creator of the configuration file and are linked to the configuration file. In one embodiment, the interface policy comprises a reference to the configuration file with permitted properties of the network interfaces. In some embodiments, the directory policy comprises a reference to the configuration file with directives which refer to at least one environment variable, and the environment variable comprises an indication of a subdirectory in the container instance. In the same way, the interface policy can comprise a reference to the configuration file with permitted properties of the network interfaces. This ensures that target directories and network interfaces can also be defined by a platform operator dynamically by way of parameters with the aid of dedicated configuration files.

Before the process of starting the container instance, method step S4 involves checking whether all subdirectories in the source directory that are stipulated by the container image for the container instance are able to be incorporated according to the directory policy, and/or whether all network interfaces that are stipulated by the configuration file are able to be incorporated according to the interface policy without contravening incorporation options for subdirectories and network interfaces of further container instances that already exist. Finally, in method step S5, the container instance is generated from the container image in the host computer only if the checking gives a positive checking result.

It is assumed that the underlying platform, i.e., the operating system 12 and the resources 11 of the host computer 10 and the container runtime environment or, if a plurality of runtime environments should be operated, all manifestations of runtime environments, is trusted and the runtime environment evaluates signatures.

If a container instance is intended to be started on the basis of the container image in the runtime environment, the stored directory policy and the interface policy for the container image are interpreted before the actual starting process. The host computer 10 or the container runtime environment can carry out the validation of the directory and interface policies. For this purpose, the host computer can comprise an insertable functional unit that calls up an independent service.

For the checking, a central incorporation database is generated for the runtime environment of the container instance. The incorporation database comprises a name and a version of the container image from which the container instance was generated, and the target directory in the container instance, the source directory of the assigned physical data memory and the permitted incorporation options and access options of the target directory, and the network interfaces and incorporation options assigned to the container instance. The incorporation database is persistently stored. On the basis of the incorporation database, a check is made to ascertain whether a source directory requested for a subdirectory, or a superordinate or subordinate directory of the source directory is incorporated. Furthermore, a check is made to ascertain whether a network interface to be incorporated is already currently incorporated for a different container image or has ever been incorporated for a container image of a different type.

After successful incorporation of a subdirectory and/or a network interface, the name and the version of the container image, the target directory in the container instance, the source directory of the assigned physical data memory and the permitted incorporation options and access options of the target directory and/or the incorporated network interface and the incorporation options for the network interface are communicated to the incorporation database and stored there.

A subdirectory is not incorporated into the container instance if upon the checking of container instances which have been formed from other container images and/or configuration files, vis-à-vis the directory policy, it is established that the directory policy contains no permitted incorporation option for the subdirectory to be incorporated or the subdirectory to be incorporated is a superordinate or subordinate directory with respect to a subdirectory not mentioned in the directory policy. Analogously, a network interface is not incorporated if upon the checking of container instances which have been formed from other container images and/or configuration files, vis-à-vis the interface policy, it is established that the interface policy contains no permitted incorporation option for the network interface to be incorporated.

A description is given below of the checking during the process of mounting a subdirectory, in particular a persistent subdirectory:

If a directory policy is stored for the container image, a check is made to ascertain whether the source directory is already being used by a different container instance or has been used by a different instance type and is thus reserved on the platform for a different image. In order to be able to check this not only for current instances but also for non-current instances, a central incorporation database is generated for the runtime environment, in which besides the name, the version (tag) of the container image and the target directory, also the desired source directory and the desired access option are persistently stored. Before the container instance based on a container image is started, firstly a check is made to ascertain whether persistent subdirectories are defined as start-up parameters at all for this container instance. If this is not the case, no further checking takes place, even if a corresponding directory policy is stored in the container image. The reason for this is that, as a result of the starting of the container instance, no data have persisted and no data of the underlying host computer that are worth protecting are jeopardized either. In an alternative variant, the runtime environment can force corresponding data also to be allocated in the case where a directory policy is present. This can e.g., likewise be defined in the directory policy for the container image.

If at least one subdirectory to be incorporated, in particular a persistent subdirectory, is specified when a container instance is started, the following are checked:

Firstly, a check is made to ascertain whether the desired target directory is identical to a directory which is stored for the container image and for which a directory policy is stored. If this is not the case or if superordinate or subordinate subdirectories are intended to be mounted into the container image, the process is terminated. This ensures that persistent data are generated only in the permitted mounting points. If a variable or a directive of a configuration file which references a subdirectory which has not yet been mounted is used for referencing, the runtime environment or the plug-in checks the referenced file on the source directory and interprets it.

If the directory policy specifies that a persistent subdirectory may only be exclusively incorporated by a container instance of one type, a check is made to ascertain whether a container instance of the same type already exists, and the mounted directory is active for the same source directory. If this is the case, the starting process is likewise terminated and the setting up of the subdirectory is refused. This ensures that e.g., two concurrent databases implemented in different container instances do not generate inconsistent data by virtue of their accessing the same persistent subdirectory. If the environment is not orchestrated, the checking can take place by virtue of a container instance with the specified subdirectory already being operated on the locally operated container runtime environments. In the orchestrated environment, for this purpose, an orchestrator can be consulted or the current container instances with the corresponding subdirectories can additionally be stored in the incorporation database. This is then continuously updated by the container runtime environment. An assigned subdirectory from a different source directory—provided that this is not yet in use—is permissible.

In the incorporation database mentioned above, a check is made to ascertain whether the desired source directory or a superordinate or subordinate path is already currently mounted for a different container image. In addition, a check is made to ascertain whether the directory or a subordinate or superordinate directory has ever been mounted for a container image of a different type, and whether this is permissible for the specified path for the specified container image with the specified incorporation options and access options. If a contravention of the stored directory policy is established in this case, the setting-up process is likewise terminated with a corresponding error message. This checking takes place even for a container image for which a specific directory policy is not stored. This prevents areas reserved by other container images from being used by unauthorized container images.

If the setting-up method is successful and has not yet been stored in the incorporation database, this is entered into the incorporation database with the metadata of the container image to be started and with the specified source directory and the version of the container image and the name of the container image. This ensures that already used directories of other container instances are correspondingly reserved and checking can take place for other container instances.

If instances of a container image are generally intended not to be operated on a host computer anymore, an administrator can erase the respective entries for a container image in the incorporation database. A container image is thus completely "deregistered" for the platform with regard to its incorporated subdirectories. Moreover, the directory and/or interface policy stored for the container image can specify that the data for older container images stored in the incorporation database are overwritten or erased, such that a modified incorporation behavior is made possible in newer versions. For the directory policy, moreover, for each subdirectory of a container image that is to be incorporated the intention is to record whether this is intended to be applicable version-specifically or generally for all the versions of this container image.

In an extended embodiment, the container runtime environment applies the specified directory and/or interface policy only to defined container images, for example depending on the signature of the container image. For a container image which does not comply with these properties, the interpretation of the directory policy can thus generally be deactivated. Only source directories of protected container images are checked and safeguarded by virtue of the starting of the container instances only being prevented for non-validated container images if an attempt is made to mount reserved source directories or the superordinate or subordinate directories with respect thereto.

The allocation of network interfaces is protected analogously. If a network interface is created from scratch, no checking is necessary. If this network interface already exists, the runtime environment checks whether the container instances linked with the network interface are specified in accordance with the interface policy and whether the container instance which is intended to be allocated the container image satisfies the requirements of the other container instances. If a contravention of the interface policy is detected here, the process of starting the container instance is refused.

The checking is carried out not only upon the starting of a container instance, but also upon dynamic addition of network interfaces at the runtime of the container instance.

In one embodiment, the directory policy and/or network policy are/is protected with the aid of a signature regarding the content of the directory policy and/or network policy. The signature is validated by the container runtime environment during the loading process. The integrity of the directory policy and/or network policy can thus be monitored.

FIG. 3 shows one embodiment of the arrangement according to the invention. The arrangement 50 comprises a generating device 20, a host computer 30 and an incorporation database 40. The incorporation database 40 can be integrated in the host computer 30 or, as illustrated, designed so as to be remote from the host computer 30 centrally and so as to be accessible to a plurality of host computers. The generating device 20 is designed to generate a directory policy 28 comprising at least one incorporation rule for allocating the subdirectory of the container instance to the subdirectory in the source directory, in particular for persistent subdirectories in which data are persistently stored. The generating device 21 is furthermore designed to generate an interface policy 27 comprising at least one incorporation rule for allocating the network interface of the container instance to the virtual and/or physical network interface of the assigned host computer 30.

The generating unit 21 is designed in such a way that both the directory policy 28 and the interface policy 27 can be created by a creator of a configuration file 24. In one embodiment variant, the generating unit 21 comprises at least a first input unit 21, via which the directory policy 28 and the interface policy 27 can be created by the creator of the configuration file 24. The generating unit 20 links the directory policy 28 and the interface policy 27 with the configuration file 24. The configuration file 24 is assigned to a container image 25.

In one embodiment variant, the generating unit 21 is designed in such a way that only the interface policy 27 can be created by the creator of the configuration file 25 and the directory policy 27 can be created by a creator of the container image 25. The generating unit 21 comprises a second input unit, for example, via which the creator of the container image 24 creates the directory policy. In this case, the directory policy 28 is linked with the container image 25, and the interface policy 27 is linked with the configuration file 24. The configuration file 24 references the container image 25 and defines the assignment from a source directory to a target directory and to the interfaces.

The generating unit comprises an output unit 23, via which the container image 25, the assigned configuration file 24, and the directory policy 28 and the interface policy 27 are loaded into a runtime environment 33 of the host computer 30. A container instance 31 is configured from the container image 25 on the basis of instructions and allocations contained in the configuration file 24 and is started. Before the process of starting a container instance 31, the host computer 30 checks whether all subdirectories in the source directory that are stipulated by the container image 25 for the container instance 31 are able to be incorporated according to the directory policy 28, and/or whether all network interfaces that are stipulated by the configuration file 24 are able to be incorporated according to the interface policy 27 without contravening incorporation options for subdirectories and network interfaces of further container instances 32 that already exist. If the checking reveals that all incorporation options of the directory and interface policies are fulfilled and a positive checking result is thus present, the container instance 31 is generated from the container image 25.

Consequently, with a directory and/or interface policy stored for the container image, it is possible to ensure that persistent data are readable and writable exclusively for a container image. The setting-up process can be prevented for unauthorized container images. In the extended variant, container images can request subdirectories that are specifically protected on the basis of their properties (e.g., on the basis of their signature). The restrictions for reading and writing will no longer only be defined by a platform operator, but rather can also be specified by the container image manufacturer. By virtue of the interpretation of variables, the validation component in the host computer can also restrict dynamically configurable subdirectories in terms of access for container instances. Device files that are intended to be assigned exclusively to a container instance can be specifically protected. Network interfaces can likewise be protected by the method, thereby preventing unauthorized container instances from being mounted on networks of other instances.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for protecting a process of setting up a subdirectory and/or a network interface for a container instance for providing a container-based application, wherein at least one subdirectory of the container instance is provided by allocating at least one subdirectory in a source directory of an assigned physical data memory and at least one network interface of the container instance is provided by allocating at least one corresponding virtual or physical network interface of an assigned host computer, comprising:
   generating a directory policy comprising at least one incorporation rule for allocating the subdirectory of the container instance to the subdirectory in the source directory; and/or
   generating an interface policy comprising at least one incorporation rule for allocating the network interface of the container instance to the network interface of the assigned host computer;
   loading container image, an assigned configuration file, and the directory policy and/or the interface policy into a runtime environment of the host computer;
   in the runtime environment before the process of starting the container instance, checking whether all subdirectories in the source directory that are stipulated by the container image for the container instance are able to be incorporated according to the directory policy, and/or whether all network interfaces that are stipulated by the configuration file are able to be incorporated according to the interface policy without contravening incorporation options for subdirectories and network interfaces of further container instances that already exist; and
   generating the container instance from the container image in the host computer only in the event of a positive checking result;
   wherein a subdirectory is not incorporated into the container instance if upon the checking of container instances which have been formed from other container images and/or configuration files, vis-à-vis the directory policy, it is established that the directory policy contains no permitted incorporation option for the subdirectory to be incorporated or the subdirectory to be incorporated is a superordinate or subordinate directory with respect to a subdirectory not mentioned in the directory policy, and/or
   wherein a network interface is not incorporated if upon the checking of container instances which have been formed from other container images and/or configuration files, vis-à-vis the interface policy, it is established that the interface policy contains no permitted incorporation option for the network interface to be incorporated.

2. The method as claimed in claim 1, wherein the directory policy and the interface policy are created by a creator of the configuration file and are linked to the configuration file.

3. The method as claimed in claim 1, wherein the directory policy is created by a creator of the container image and is linked to the container image.

4. The method as claimed in claim 3, wherein the directory policy comprises metainformation in regard to the subdirectories and the metainformation in the form of an image tag is allocated to the container image.

5. The method as claimed in claim 1, wherein the directory policy and/or the interface policy stipulate(s) whether the subdirectory in the source directory and/or the network interface may be incorporated exclusively by a single container instance or by a plurality of container instances formed from the same container image or by a plurality of container instances formed from different container images.

6. The method as claimed in claim 1, wherein the directory policy stipulates a permitted access option to the subdirectory or the network interface.

7. The method as claimed in claim 1, wherein the directory policy and/or the interface policy stipulate(s) incorporation rules depending on a signature of the container image.

8. The method as claimed in claim 1, wherein the directory policy comprises a reference to the configuration file with directives which refer to at least one environment variable, and the environment variable comprises an indication of a subdirectory in the container instance.

9. The method as claimed in claim 1, wherein the interface policy comprises a reference to the configuration file with permitted properties of the network interfaces.

10. The method as claimed in claim 1, wherein a central incorporation database is generated for the runtime environment of the container instance, and the central incorporation database comprises a name and a version of the container image from which the container instance was generated, the target directory in the container instance, the source directory of the assigned physical data memory and the permitted incorporation options and access options of the target directory, and the network interfaces and incorporation options assigned to the container instance.

11. The method as claimed in claim 10, wherein the central incorporation database is persistently stored.

12. The method as claimed in claim 10, wherein on the basis of the central incorporation database, a check is made to ascertain whether a source directory requested for a subdirectory or a superordinate or subordinate directory of the source directory and/or whether a network interface to be incorporated is already currently incorporated for a different container image or has ever been incorporated for a container image of a different type.

13. The method as claimed in claim 10, wherein after successful incorporation of a subdirectory and/or a network interface, the name and the version of the container image, the target directory in the container instance, the source directory of the assigned physical data memory and the permitted incorporation options and access options of the target directory and/or the incorporated network interface and the central incorporation options for the network interface are communicated to the central incorporation database and stored there.

14. An arrangement for protecting a process of setting up at least one subdirectory and/or at least one network interface for a container instance for providing a container-based application, wherein a subdirectory of the container instance is provided by allocating at least one subdirectory in a source directory of an assigned physical data memory and at least one network interface of the container instance is provided by allocating at least one virtual or physical network interface of an assigned host computer, comprising a generating device configured

- to generate a directory policy comprising at least one incorporation rule for allocating the subdirectory of the container instance to the subdirectory in the source directory;
- to generate an interface policy comprising at least one incorporation rule for allocating the network interface of the container instance to the virtual and/or physical network interface of the assigned host computer,
- to load a container image, an assigned configuration file, and the directory policy and the interface policy into a runtime environment of the host computer, and the host computer is configured,
- in the runtime environment before the process of starting the container instance, to check whether all subdirectories in the source directory that are stipulated by the container image for the container instance are able to be incorporated according to the directory policy, and/or whether all network interfaces that are stipulated by the configuration file are able to be incorporated according to the interface policy without contravening incorporation options for subdirectories and network interfaces of further container instances that already exist, and
- to generate the container instance from the container image in the host computer only in the event of a positive checking result,
- wherein a subdirectory is not incorporated into the container instance if upon the checking of container instances which have been formed from other container images and/or configuration files, vis-à-vis the directory policy, it is established that the directory policy contains no permitted incorporation option for the subdirectory to be incorporated or the subdirectory to be incorporated is a superordinate or subordinate directory with respect to a subdirectory not mentioned in the directory policy, and/or
- wherein a network interface is not incorporated if upon the checking of container instances which have been formed from other container images and/or configuration files, vis-à-vis the interface policy, it is established that the interface policy contains no permitted incorporation option for the network interface to be incorporated.

15. A computer program product, comprising a computer readable hardware storage device having computer readable program code stored therein, said program code executable by a processor of a computer system to implement a method, comprising a nonvolatile computer-readable medium, which is loadable directly into a memory of a digital computer, comprising program code parts which, when the program code parts are executed by the digital computer, cause the latter to carry out the steps of the method as claimed in claim 1.

16. The arrangement of claim 14, wherein the generating the directory policy further comprises the at least one incorporation rule for allocating the subdirectory of the container instance to the subdirectory in the source directory is for persistent subdirectories in which data is persistently stored.

* * * * *